(12) United States Patent
Christopher et al.

(10) Patent No.: US 8,412,380 B2
(45) Date of Patent: Apr. 2, 2013

(54) CURE TIME ADJUSTMENT FOR A RUBBER ARTICLE

(75) Inventors: Norman Christopher, Fountain Inn, SC (US); Stephen Manuel, Flat Rock, NC (US); Robert Young, Simpsonville, SC (US)

(73) Assignees: Companjnie Generale des Establissements, Michelig (FR); Michelin Recherche et Technique S.A. (CH)

( * ) Notice: Subject to any disclaimer, the term of this patent is extended or adjusted under 35 U.S.C. 154(b) by 168 days.

(21) Appl. No.: 12/679,798

(22) PCT Filed: Sep. 27, 2007

(86) PCT No.: PCT/US2007/079664
§ 371 (c)(1),
(2), (4) Date: Jun. 10, 2010

(87) PCT Pub. No.: WO2009/041971
PCT Pub. Date: Apr. 2, 2009

(65) Prior Publication Data
US 2010/0298979 A1    Nov. 25, 2010

(51) Int. Cl.
*G05B 21/00* (2006.01)
*B29C 35/00* (2006.01)
*B29C 35/02* (2006.01)
*B29B 13/00* (2006.01)

(52) U.S. Cl. .......................... 700/274; 700/266; 425/143

(58) Field of Classification Search .................. None
See application file for complete search history.

(56) References Cited

U.S. PATENT DOCUMENTS

| | | | |
|---|---|---|---|
| 3,531,996 | A | 10/1970 | Harris et al. |
| 4,371,483 | A | 2/1983 | Mattson |
| 5,345,397 | A | 9/1994 | Handel et al. |
| 5,865,535 | A | 2/1999 | Edwards |
| 2006/0181599 | A1 | 8/2006 | Okada |
| 2007/0100042 | A1 | 5/2007 | Hetzel |

FOREIGN PATENT DOCUMENTS

GB    1282737 A    7/1972

OTHER PUBLICATIONS

European Patent Office, Extended European Search Report—EP Application No. EP 07 84 3311—dated Mar. 22, 2011.
International Search Report and Written Opinion for PCT/US07/79664, dated Jan. 24, 2008.
Bourne, "Area Under the Plasma Concentration Time," Jan. 30, 2003. Retrieved from Internet <http://www.boomer.org/c/p3/c02/c0210.html>, p. 2 and 4.

*Primary Examiner* — Neil N Turk
(74) *Attorney, Agent, or Firm* — Frank J. Campigotto

(57) ABSTRACT

A method for curing a rubber article including maintaining a measured curing temperature between a high temperature limit (TH) and a low temperature limit (TL). The TH TL are derived from high and low temperature curing curves respectively. Other steps may include obtaining a curing target A1 or A2, wherein A1 and A2 are areas between the high temperature curing curve and a base temperature (TB) and the low temperature curing curve respectively wherein TB is selected to make A1 and A2 within at least 10% of each other and determining an area under a measured curing curve, the area under the measured curing curve being between the measured curing curve and the TB, wherein the measured curing curve is defined as a plot of the measured curing temperature over time.

23 Claims, 6 Drawing Sheets

CURE TIME ADJUSTMENT FOR A RUBBER ARTICLE

BACKGROUND OF THE INVENTION

1. Field of the Invention

This invention relates generally to rubber curing and more specifically, to curing of rubber articles.

2. Description of the Related Art

When tires become worn, they can be restored with new tread. Large truck tires and bus tires, for example, are typically retreaded as part of a routine tire-management program. The carcass of a these types of tires is expected to last several hundred thousand miles and be amenable to having a new tread adhered to it several times. Such tires are quite expensive and are therefore bought with the expectation that their high initial costs are offset by the long service life of the carcass and the low comparative cost of retreading. Indeed, the economics included in the selection and purchase of such tires often dictate that the original tires be capable of being retreaded as many as three or four times.

A variety of procedures and different types of equipment are available for use in recapping or retreading pneumatic tires. One of the first steps in retreading a worn tire is to remove remaining tread material from the tire carcass, for example, by a procedure known as buffing. Next a layer of green (uncured) rubber, known as "cushion gum," may be applied to the carcass. This layer of extruded uncured rubber may be stitched or adhesively bonded to the carcass. Next, a tread band is applied atop the layer of cushion gum. In the cold recapping process, the tread is cured rubber, and has a tread pattern already impressed in its outer surface. The tire is then placed in an autoclave, and heated under pressure for an appropriate time to induce curing of the gum layer, and bonding of the gum layer to the tread and the carcass. In the hot recapping process, the tread is uncured rubber, and has no tread pattern. The tire is then placed in a tire mold and heated under pressure for an appropriate time to cure the gum layer and the tread, and to cause the gum layer to bind with the tread and the carcass. The term "cure" refers to the formation of cross-links between the elastomer molecules in the rubber compound, otherwise known as vulcanization.

SUMMARY OF THE INVENTION

Particular embodiments of the present invention include methods, computer program products and a system for curing a rubber article. Methods that are particular embodiments of the present invention include the step of maintaining a measured curing temperature (TM) between a high temperature limit (TH) and a low temperature limit (TL), wherein the TH is derived from a high temperature curing curve and the TL is derived from a low temperature curing curve. Other steps may include obtaining a curing target A1 or A2, wherein A1 is an area between the high temperature curing curve and a base temperature (TB) and A2 is an area between the low temperature curing curve and the TB, wherein the TB is selected to make A1 and A2 within at least 10% of each other and determining an area under a measured curing curve, the area under the measured curing curve being between the measured curing curve and the TB, wherein the measured curing curve is defined as a plot of the measured curing temperature over time.

Particular embodiments of such methods may further include the steps of indicating a completed cure when the area under the measured curing curve reaches the curing target and obtaining the base temperature.

Particular embodiments of such methods may further include the step of indicating a completed cure when the area under the measured curing curve reaches the curing target.

Particular embodiments of the present invention further include a computer program product including instructions embodied on a computer readable storage medium, the computer program product acting to cure a rubber article. Particular embodiments of the present invention, that are instructions embodied on a computer readable storage medium for curing a rubber article, include instructions for performing the methods described above.

Particular embodiments of the present invention further include a system for curing a rubber article. The system includes an autoclave comprising a chamber that is controllably heated for curing the rubber article and a temperature sensor for generating a signal as a function of a curing temperature in the chamber of the autoclave. The system further includes a controller for controlling the curing temperature in the autoclave, the controller comprising a processor and a memory storage device that stores instructions executable by the processor. These executable instructions include the instructions to implement the methods disclosed above.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

The present invention provides methods, computer programs and systems for adjusting the cure time of a rubber article. Particular embodiments of the present invention include a retread tire as the article.

Uncured rubber is easily deformed when warm and is quite brittle when cold. Curing a rubber article provides cross-links between the polymer chains of the rubber and imparts the property of elasticity that is typical of articles made of cured rubber. A rubber article may be cured in an autoclave by holding the article at a set temperature and at a set pressure for a set period of time. If the temperature fluctuates during the curing cycle by more than a few degrees of acceptable tolerance, the cure may be declared as a noncompliant cure and the improperly cured articles may have to be discarded. Particular embodiments of the present invention provide methods for automatically adjusting the cure time to account for wider temperature fluctuations and still provide for a compliant cure.

An autoclave is commonly used in the industry for curing rubber articles. The autoclave includes a chamber for containing the rubber articles during the curing process and a mechanism for controlling the temperature and pressure within the autoclave.

Figure 1:
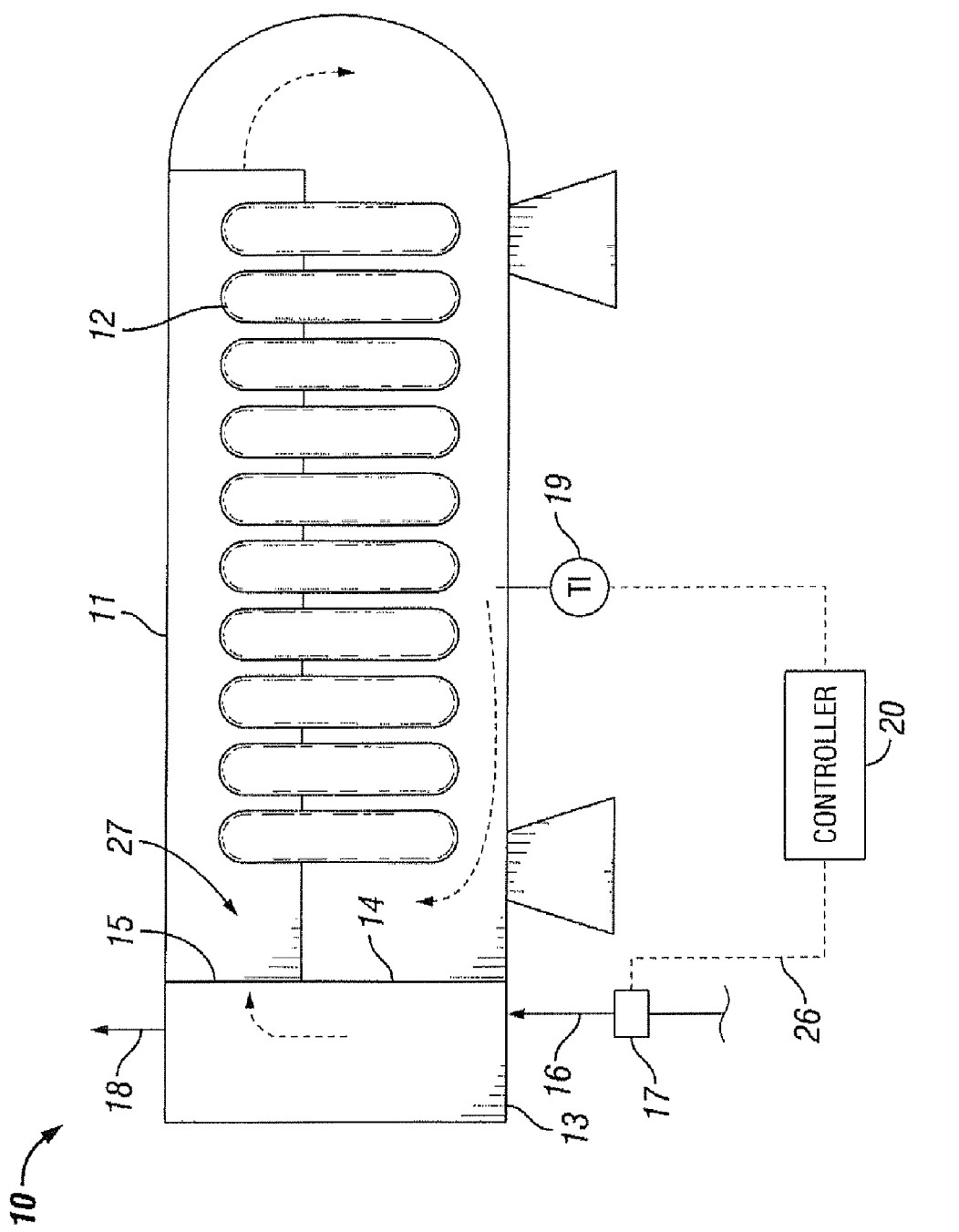
FIG. 1 is a schematic drawing of an autoclave suitable for curing a retread tire.

FIG. 1 is a schematic drawing of an autoclave 10 suitable for curing a retread tire. The autoclave 10 includes an elongated chamber 11 for containing the tires 12 during the curing process. A temperature indicator 19, such as a thermocouple, sends a signal to the controller 20. The controller 20 controls the temperature in the autoclave by sending a signal to a control device, such as a valve 17, which controls the heat input into the autoclave. The heat input may be provided, for example, by an electric resistance coil, by a heating medium such as steam or by a circulating medium such as hot water, hot oil or so forth. In the embodiment shown, the heating medium is a circulating heating medium, such as hot water, that includes a hot water inlet 16 and a hot water outlet 18 to and from the heat exchanger 13.

Air is circulated through the autoclave 10 by flowing through the heat exchanger 13 where the air is heated by the circulating heating medium. The air enters the heat exchanger at the air inlet 14 and exits the heat exchanger 13 at the air outlet 15, where it passes into the air supply duct 27. The air supply duct 27 opens into the far end of the chamber 11 and flows back to the air inlet 14 of the heat exchanger 13. The circulating air passes over the tires 12 to heat them during the curing process.

Figure 2:
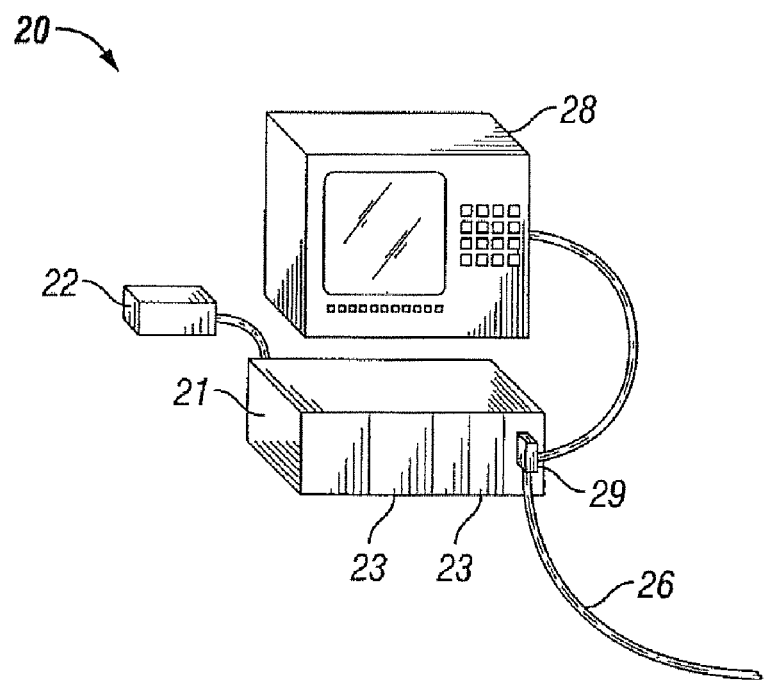
FIG. 2 is a schematic drawing of a controller suitable for controlling the temperature in an autoclave in accordance with particular embodiments of the present invention.

FIG. 2 is a schematic drawing of a controller suitable for controlling the temperature in the autoclave of FIG. 1 in accordance with particular embodiments of the present invention. The controller 20 may be a programmable logic controller as shown in FIG. 2 or other device having a processor that can execute programmed instructions, such as, for example, a personal computer, main frame computer or other control system.

The controller 20 interprets the signal received from the temperature indicator 19. Without limitation, the signal from the temperature indicator 19 may be sent by wireless communication to the controller 20, such as by infrared signal or by radio frequency, by one or more cables, including fiber optics, or by any other methods or devices known to those having ordinary skill in the art.

The programmable logic controller 20 generally receives a signal from the temperature indicator 19 to monitor and control the temperature in the autoclave 10. The controller 20 provides a signal 26 to the valve 17 to manipulate the valve 17 and thereby control the temperature in the chamber 11.

The controller 20 includes a processor 21, which may be a microprocessor. The controller 20 further includes a memory storage device 22, such as RAM (random access memory), ROM (read-only memory), PROM (programmable read-only memory) and at least one input/output (I/O) cable 26 for communicating with the temperature indicator 19 and the valve 17. Further, the controller 20 may include an I/O slot 23 for housing an I/O card having I/O cable connector 29. An operator may utilize a user interface 28 to monitor the temperature measurements and to program, or otherwise control or instruct, the operation of controller 20 and the autoclave 10, which includes performing each step and method associated with curing a rubber article in accordance to particular embodiments of the present invention.

Generally, the controller 20 may be programmed by any known graphical or text language. Programmed instructions, data, input and output may be stored in a memory storage device 22, which is accessible to the processor 21. Particularly, programmed instructions related to the methods disclosed herein may be stored in the memory storage device 22 and executed by the processor 21. The memory device 22 may comprise any commercially known storage device, such as hard disk drives, optical storage devices, flash memory, and the like. The processor 21 executes programmed instructions pertaining to the methods disclosed herein as well as other operations discussed herein. The memory storage device 22 also stores inputs, outputs, and other information, such as, for example, temperatures measured within the autoclave 10 over the curing time period, base temperatures input by an operator and/or curing targets as described below.

A rubber article may include, for example, hoses, belts, vibration mounts, bumpers, tires and parts of tires including cushion gums, and repairs using the methods and systems disclosed herein.

During the curing of a rubber article, a sufficient amount of heat energy is provided to the rubber article to complete the cure of the rubber article. Such methods are well known in the industry and result in a curing process tailored for the articles being cured. The curing process, as noted above, includes setting a time period for which the articles to be cured are maintained at a set temperature and a set pressure. The required time period and temperature over which the articles must be held to achieve a compliant cure may be described by a curing curve, which plots the curing temperature over time.

The curing curves are typically derived through experimentation or finite analysis methods. ASTM D2084 and ISO 3417 describe how to measure cure times required for rubber compounds using an oscillating rheometer. Factors that are included in determining the curing process and the curing curves include, for example, the rubber composition and the thickness of the rubber article. As known by one having ordinary skill in the art, a rubber article must be cured for a sufficient time that the temperature of the rubber article is increased to the desired temperature to complete a compliant cure.

For example, a particular rubber article may be cured at a higher temperature for a shorter period of time or at a lower temperature for a longer period of time to achieve a compliant cure of the article. Likewise, the temperature profile that is held for the cure time, and is illustrated by a curing curve, does not have to be constant. These concepts are illustrated in FIGS. 3 and 4.

Figure 3:
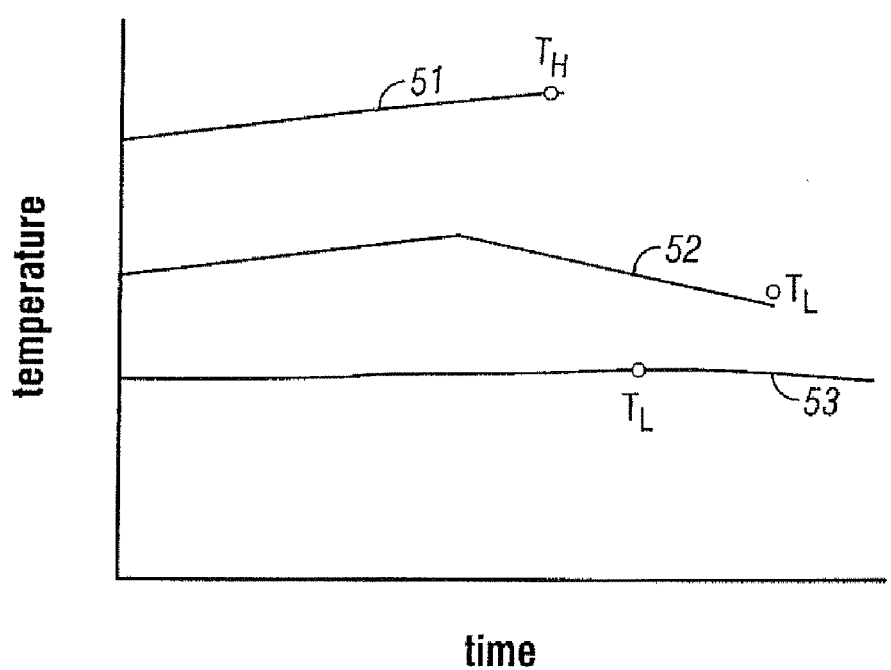
FIG. 3 is a graph showing compliant curing curves at varying temperatures for a given rubber article.

FIG. 3 is a graph showing compliant curing curves at various temperatures for a given rubber article. As shown, a compliant cure of the rubber article may be achieved by maintaining the temperature along the curing curve 51 at the highest temperature for the shortest period of time. Alternatively, the article may be cured along the intermediate temperature curing curve 52 for a longer period of time to achieve a compliant cure. Further, as another alternative, the article may be cured along the lowest temperature curing curve 53 for an even longer period of time to achieve a compliant cure. Each of these curing curves 51, 52, 53 are obtained by methods well known by those having ordinary skill in the art.

Figure 4:
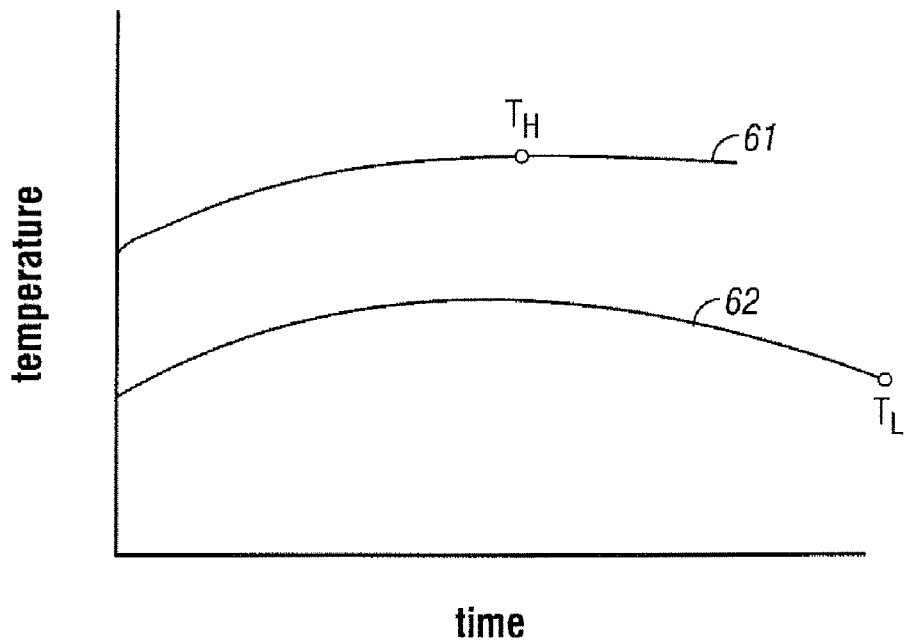
FIG. 4 is a graph showing compliant curing curves at varying temperatures for a given rubber article.

FIG. 4 is a graph showing compliant curing curves at varying temperatures for a given rubber article. The graphs shown in FIG. 4 demonstrate that the temperatures do not have to follow a linear relationship, as those shown in FIG. 3, to obtain a compliant cure. As in FIG. 4, the higher temperature curing curve 61 provides a compliant cure over a shorter period of time than the lower temperature curing curve 62.

Figure 5:
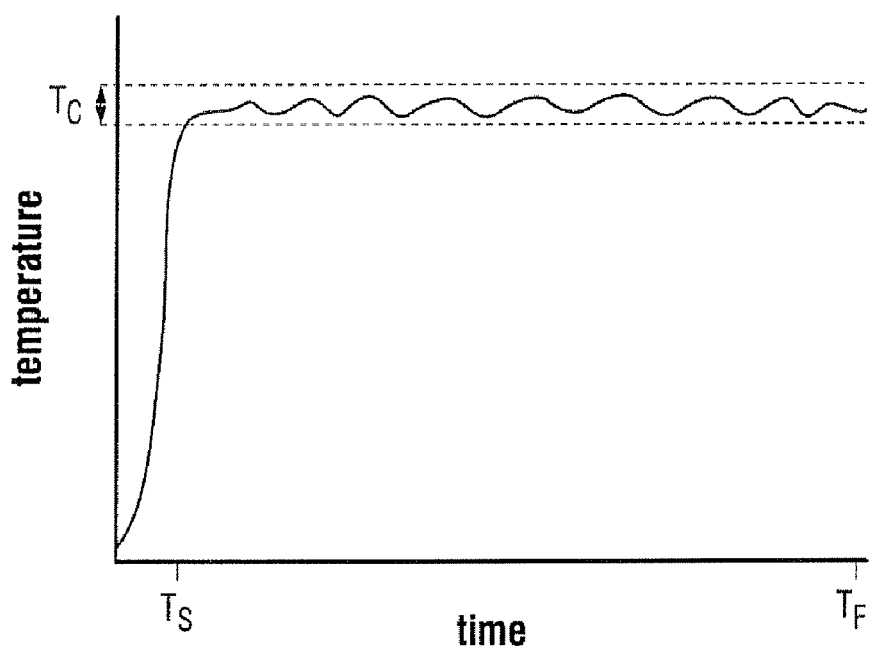
FIG. 5 is a graph showing a typical cure cycle for a rubber article.

FIG. 5 is a graph showing a typical cure cycle for a rubber article. The graph shows the measured temperature in an autoclave over a period of time during which the article is being cured. The measured temperature is shown increasing from ambient to the narrow curing temperature range TC. For a compliant curve, the temperature will be held within the temperature range TC. The narrow curing temperature range TC is determined to be the acceptable tolerance around a curing curve, such as those shown in FIGS. 3 and 4. This tolerance is typically no more than about plus or minus 5° C.

After the measured temperature reaches the curing temperature range TC, the cure time is started at "ts" and continues for the prescribed set period of time ending at "tf." The cure is considered compliant as long as the temperature in the autoclave stays within the acceptable tolerance of the narrow curing temperature range TC over the prescribed period of time from "ts" to "tf."

As noted previously, a problem in the industry is that if the temperature in the autoclave is not maintained along the prescribed curing curve, e.g., TC in FIG. 5, and the temperature drops below the prescribed curing temperature range, then the cure of the rubber articles is non-compliant and the articles may have to be scrapped or reconditioned, increasing the time and cost for the process. Particular embodiments of the present invention include, inter alia, methods for adjusting a cure time for a rubber article to prevent or minimize the occurrence of such a non-compliant cure and the associated costs.

In one embodiment of the present invention, a method for curing a rubber article includes the step of maintaining a measured curing temperature (TM) that is between a high temperature limit (TH) and a low temperature limit (TL). The high temperature limit and the low temperature limit are each derived from a high temperature curing curve and a low temperature curing curve respectively. These different curing curves each provide a compliant cure for the rubber article, one at a higher temperature for a shorter period of time and one at a lower temperature for a longer period of time.

For example, as shown in FIG. 3, the curing curve 51 shown at the highest temperature may be considered a high temperature curing curse and the curing curve 53 shown at the lowest temperature may be considered a low temperature curing curve. The third curve 52 shown may be considered either a high temperature curing curve when paired with the low temperature curing curve 53 or it 52 may be considered a low temperature curing curve when paired with the high temperature curing curve 51.

In particular embodiments of the present invention, the high temperature limit (TH) is derived from the high temperature curing curve and the low temperature limit (TL) is derived from the low temperature curing curve. For example, the TH may be the highest temperature on the high temperature curing curve and the TL may be the lowest temperature on the low temperature curing curve. Examples of such limits are illustrated in FIG. 3.

Alternatively, in other embodiments, the TH (and by analogy the TL) may be selected, for example, as an average of the 3 highest (lowest) temperatures on the high (low) temperature curing curve, an average of all the temperatures on the high (low) temperature curing curve, the third highest (lowest) temperature on the high (low) temperature curing curve or any other selection that would be suitable for a given application.

It should be noted that since each of the curing curves has a tolerance over which the cure may take place, (FC in FIG. 5), the acceptable tolerance applies to the TH and the TL that are derived from the high and low temperature curing curves. For example, if the high temperature limit is derived from the high temperature curing curve as being 130° C., and the acceptable tolerance is 5° C., then the high temperature limit may be derived from the high temperature curing curve as being as high as 135° C. Likewise, if the low temperature limit is derived from the low temperature curing curve as being 75° C., and the acceptable tolerance is 5° C., then the low temperature limit may be derived from the low temperature curing curve as being as low as 70° C.

Advantageously, if the TH and the TL are sufficiently separated, the article may have a compliant cure over a much wider temperature range during the curing process, therefore reducing the chances of a non-compliant cure that would be caused should, for example, the measured cure temperature dip to below the acceptable measured cure temperature. Without limiting the invention, particular embodiments of the present invention include a difference between the high temperature limit and the low temperature limit of between 10° C. and 50° C., between 15° C. and 70° C., between 20° C. and 35° C. or between 5° C. and 70° C. Other embodiments include a temperature difference that is at least 5° C., at least 10° C. or at least 35° C.

Particular embodiments of the present invention for the method of curing a rubber article may further include the step of obtaining a curing target A1 or A2, wherein A1 is an area between the high temperature curing curve and a base temperature (TB) and A2 is an area between the low temperature curing curve and the TB, wherein the TB is selected to make A1 and A2 within at least 10% of each other. Particular embodiments of the present invention for the method of curing a rubber article may further include the step of obtaining the base temperature.

In particular embodiments, the curing target and base temperature for example, may be obtained by the controller 20 from a database or from a manual operator input. An operator may enter the curing target or base temperature at the user interface 28. The data may be stored in the memory device 22 as a value to be obtained by the controller 20.

Typically, the base temperature (TB) is less than the low temperature limit (TL). Without limiting the invention, particular embodiments of the present invention include a difference between TB and TL that may be as little as 5° C. or 15° C. and as much as 70° C.

Because the measured temperature within the autoclave is allowed to vary anywhere between the TH and the TL, a curing target must be set for determining when a compliant cure is achieved. The curing target may be set as being equal to the area under the high temperature curing curve and a base temperature or equal to the area under the low temperature curing curve and the base temperature. In particular embodiments of the present invention, the base temperature is set to make these two target areas within at least 10% of each other. In alternate embodiments, the base temperature is set to make these target areas, for example, within at least 5% of each other or equal to each other.

Figure 6:
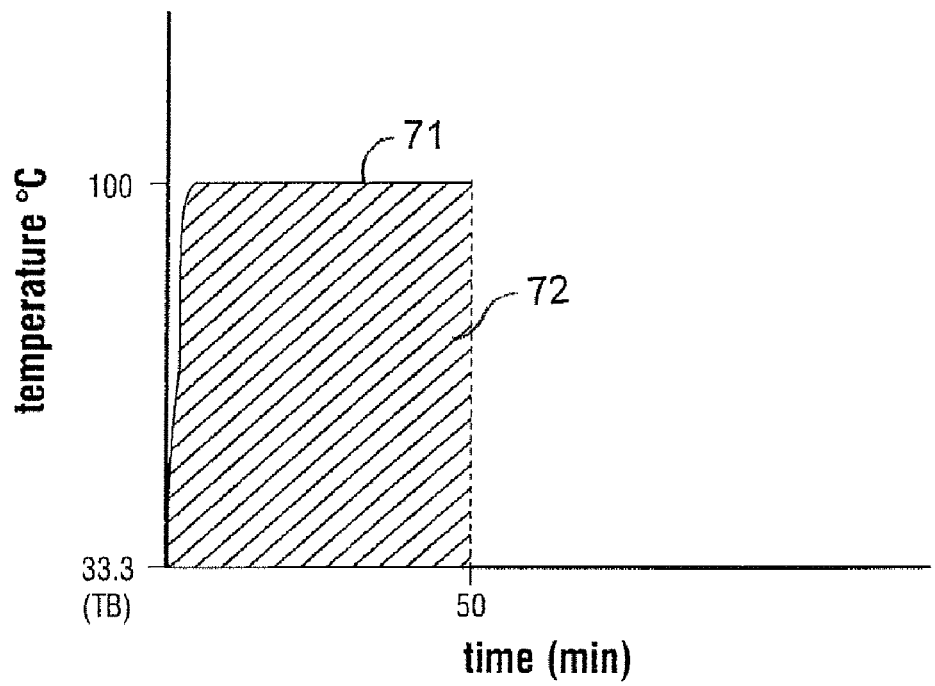
FIG. 6 is a graph showing the area between a high temperature curing curve and the base temperature.
Figure 7:
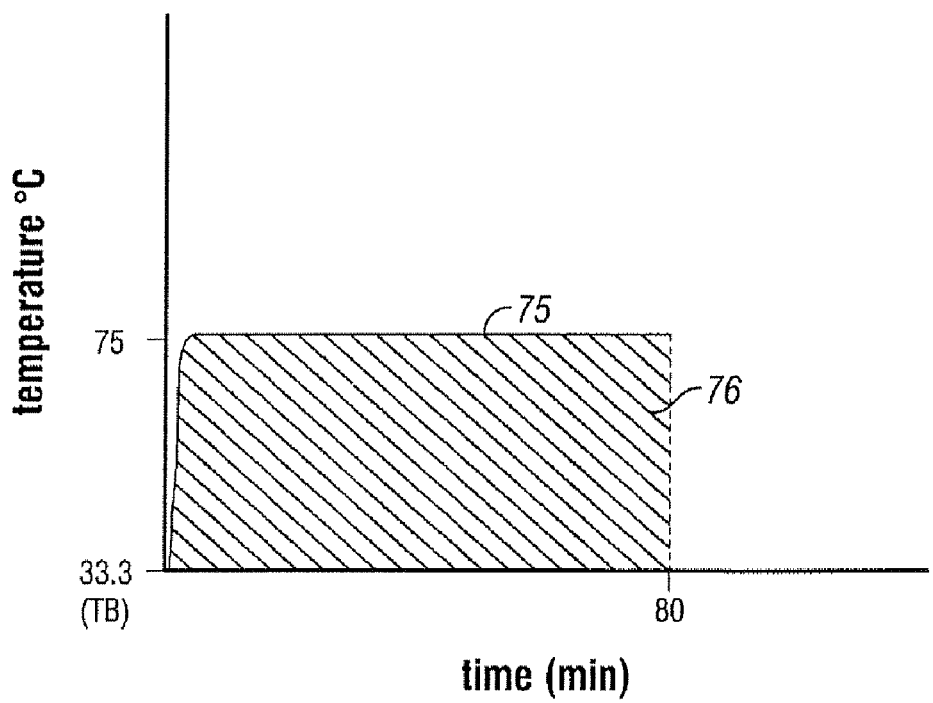
FIG. 7 is a graph showing the area between a low temperature curing curve and the base temperature.

FIGS. 6 and 7 are graphs showing the target area between a high temperature curing curve and the base temperature and the target area between a low temperature curing curve and the base temperature respectively. As shown in FIGS. 6 and 7, and as expected, the high temperature curing curve 71 of the example shown cures an article in a shorter period of time (50 min) than the period of time (80 min) required to cure the article according to the low temperature curing curve 75 of FIG. 7.

In the example provided, the base temperature TB was chosen to make the target area 72 between the high temperature curing curve 71 and the TB equal to the target area 76 between the low temperature curing curve 75 and the TB.

There are many ways to determine or calculate the TB that makes the target areas 72, 76 equal. If, as in the example of FIGS. 6 and 7 the target areas 72, 76 are essentially rectangles, the target areas may be calculated as:

$$A1 = (CH-TB)(CTH) \quad (1)$$

$$A2 = (CL-TB)(CTL) \quad (2)$$

wherein A1 is the target area under the high temperature curing curve, A2 is the target area under the low temperature curing curve, CH and CL are the high and low curing temperatures respectively and CTH and CTL are the high and low curing times respectively. Since the TB is being selected to make A1=A2, equations (1) and (2) can be set equal to each other and solved for TB, resulting in the following equation (3):

$$TB = ((CL)(CTL) - (CH)(CTH))/(CTL-CTH). \quad (3)$$

Solving Equation (3) with the numbers provided in the example of FIGS. 6 and 7 provides a TB of 33.3° C. Inserting that number into either equation (1) or (2) provides a cure target of 3336 degrees·minutes for the example shown in these figures.

Particular embodiments of the present invention for the method of curing a rubber article may further include the steps of determining an area under a measured curing curve, the area under the measured curing curve being between the measured curing curve and the TB, wherein the measured curing curve is defined as a plot of the measured curing temperatures over time. Such embodiments may include an additional step of indicating a completed cure when the area under the measured curing curve reaches the curing target. The step of setting the curing target was discussed above. Such indicator may be provided, for example by sending a message to the operator interface 28 or controller 20 or by simply starting to cool the autoclave.

Figure 8:
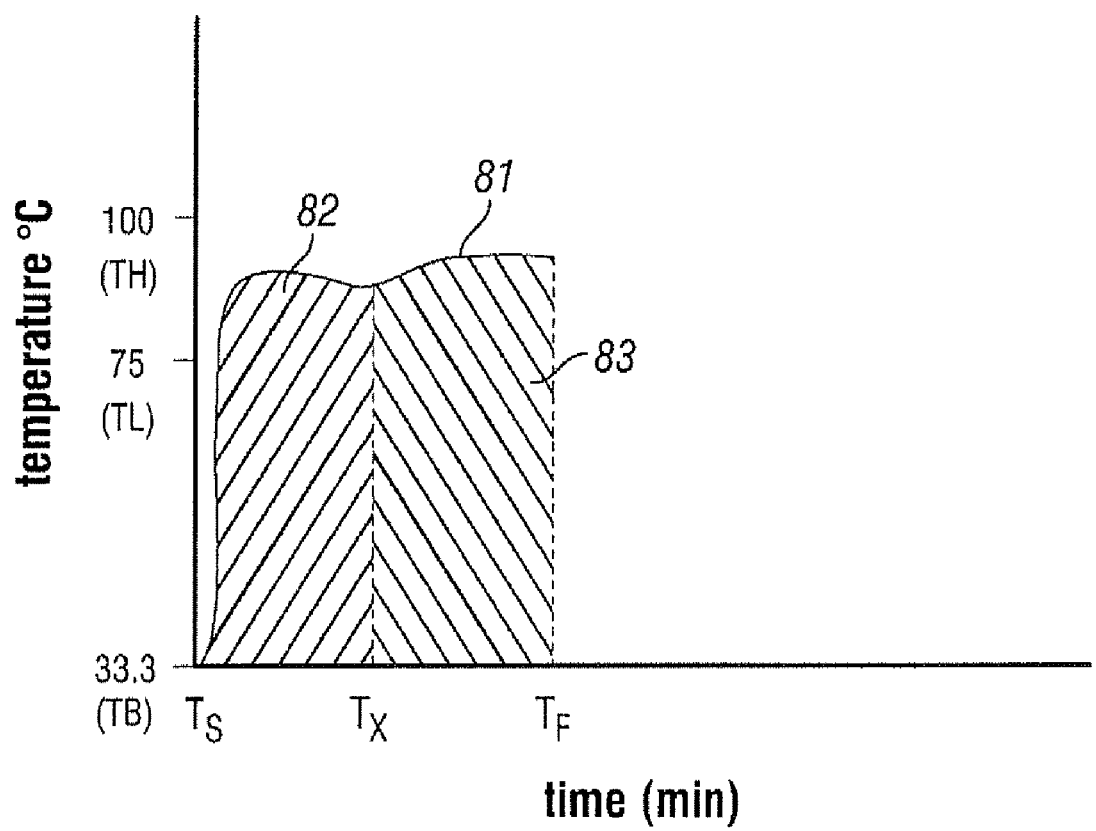
FIG. 8 is a graph showing the area between a measured curing curve and the base temperature in accordance with particular embodiments of the present invention.

For example, FIG. 8 is a graph showing the area between a measured curing curve and the base temperature in accordance with particular embodiments of the present invention. The measured curing curve 81 is a plot of the measured temperatures within the autoclave over time, the autoclave being controlled pursuant to the curing curves shown in FIGS. 6 and 7. As shown in the example of FIG. 8, the temperature within the autoclave rises quickly to a temperature between the low temperature limit TL and the high temperature limit TH. The cure time starts when the temperature reaches the TB at time "ts" and continues until time "tx." At time "tx", the area 82 shown under the measured curing curve 81 is not equal to the target area. Therefore the curing continues until "tf," when the additional area 83 under the measured curing curve 81 makes the total of the areas 82, 83 under the measured curing curve 81 equal to the target area. At that point, a compliant cure has been achieved.

While there are several methods known to one of ordinary skill in the art for determining the area between the measured curing curve and the base temperature, one equation that may be used is the following equation (4):

$$\sum_{n=1}^{tf} (TM - TB)_n (\Delta t)_n \quad (4)$$

wherein TM is the measured cure temperature, TB is the base temperature, Δt is the time increment over which the nth difference is calculated, and n is the number of time increments taken over the range between the start of the cure and $t_f$, the time when the cure is complete.

Figure 9:
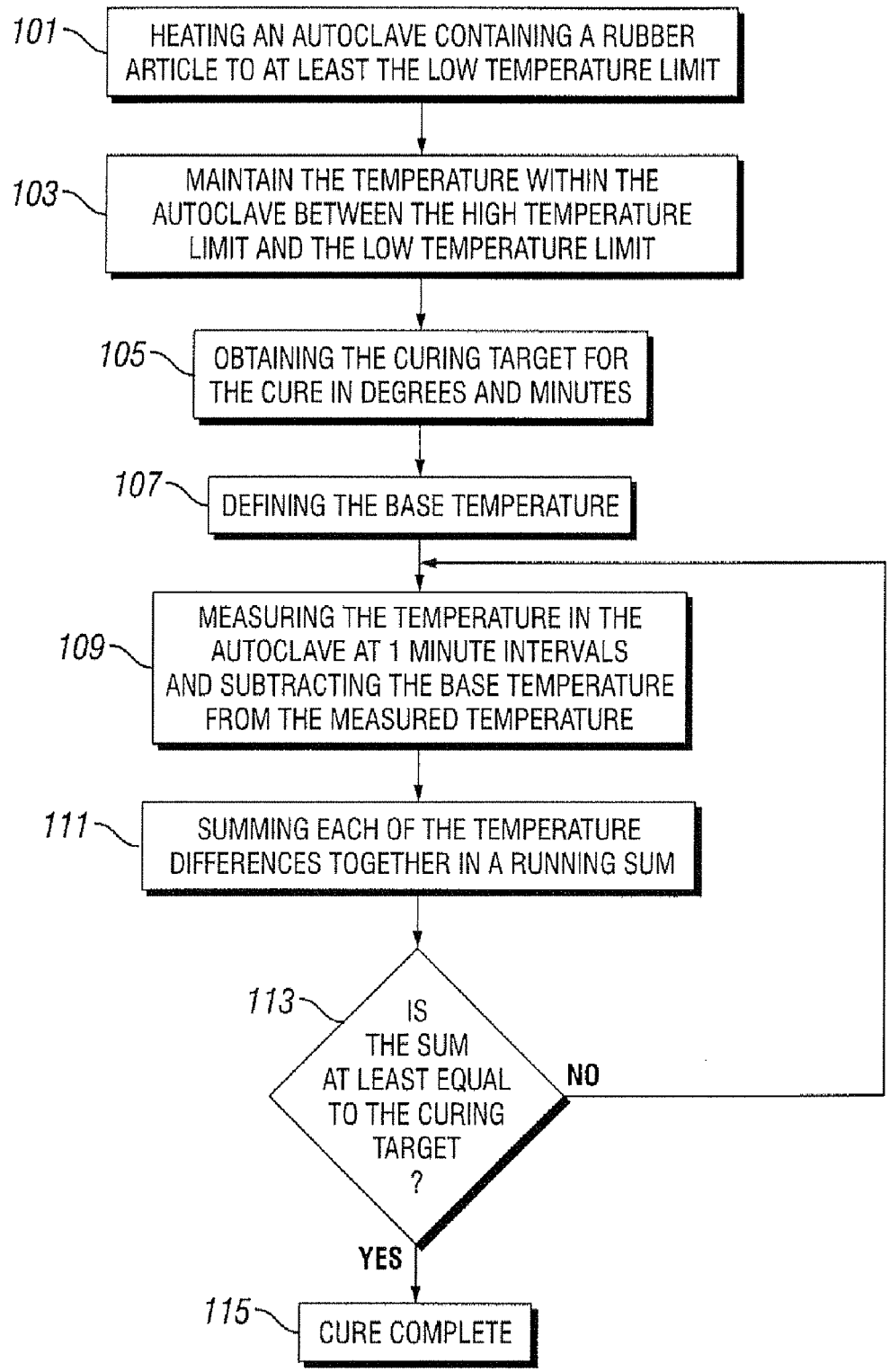
FIG. 9 is a flowchart of an exemplary method for curing a rubber a executable on the system of FIG. 1 in accordance with the present invention.

FIG. 9 is a flowchart of an exemplary method for curing a rubber article, executable on the system of FIG. 1 in accordance with the present invention. In state 101, the autoclave containing a rubber article to be cured is heated to at least the low temperature limit. In state 103, the temperature within the autoclave is maintained between the high temperature limit and the low temperature limit.

In state 105, the curing target is set for the cure, the curing target in this embodiment having the units of degrees·minutes. In state 107, the base temperature is defined.

In state 109, the temperature is measured within the autoclave at 1 minute intervals and the base temperature is subtracted from each of the measured temperatures. In state 111, each of these differences is summed in a running sum of the differences. In state 113, the running sum is compared to the curing target and if the running sum is less than the curing target, then the method returns to state 109. If the running sum is at least equal to or greater than the curing target, then the method continues to state 115 and the cure is complete.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A method for curing a rubber article, the method comprising:

maintaining a measured curing temperature (TM) within a curing chamber between a high temperature limit (TH) and a low temperature limit (TL), wherein the TH is derived from a high temperature curing curve and the TL is derived from a low temperature curing curve;

obtaining a curing target A1 or A2, wherein A1 is an area between the high temperature curing curve and a base temperature (TB) and A2 is an area between the low temperature curing curve and the TB, wherein the TB is selected to make A1 and A2 within at least 10% of each other;

determining an area under a measured curing curve, the area under the measured curing curve being between the measured curing curve and the TB, wherein the measured curing curve is defined as a plot of the measured curing temperature over time; and indicating a completed cure of the rubber article when the area under the measured curing curve reaches the curing target.

2. The method of claim 1, wherein the TB is selected to make A1 and A2 within 5% of each other.

3. The method of claim 1, wherein the TB is selected to make A1 and A2 equal.

4. The method of claim 1, wherein the step of determining the area under the measured curing curve comprises:
calculating the area under the measured curing curve using the equation $$\sum_{n=1}^{tf}(TM-TB)_n(\Delta t)_n$$

wherein TM is the measured curing temperature, TB is the base temperature, $\Delta t$ is a time increment over which an nth difference is calculated and n is the number of time increments taken over a range between a start of the cure to $t_f$, a time when the cure is complete.

5. The method of claim 1, wherein the difference between the TH and the TL is between 10° C. and 50° C.

6. The method of claim 1, wherein the difference between the TH and the TL is between 15° C. and 70° C.

7. The method of claim 1, wherein the article is at least a part of a tire.

8. The method of claim 1, wherein the article is a cushion gum between a tire tread and a tire carcass.

9. The method of claim 1, wherein the TH is the highest temperature on the high temperature curing curve.

10. The method of claim 1, wherein the TL is the lowest temperature on the low temperature curing curve.

11. The method of claim 1, wherein the method further comprises:
obtaining the base temperature.

12. A non-transitory computer-readable medium encoded with computer-executable instructions for a controller processor to perform a method of curing a rubber article, the encoded, computer-executable instructions comprising:
maintaining instructions for maintaining a measured curing temperature (TM) within a curing chamber between a high temperature limit (TH) and a low temperature limit (TL), wherein the TH is derived from a high temperature curing curve and the TL is derived from a low temperature curing curve;
obtaining instructions for obtaining a curing target A1 or A2, wherein A1 is an area between the high temperature curing curve and a base temperature (TB) and A2 is an area between the low temperature curing curve and the TB, wherein the TB is selected to make A1 and A2 within at least 10% of each other;
determining instructions for determining an area under a measured curing curve, the area under the measured curing curve being between the measured curing curve and the TB, wherein the measured curing curve is defined as a plot of the measured curing temperature over time; and
indicating instructions for indicating a completed cure of the rubber article when the area under the measured curing curve reaches the curing target.

13. The computer program product of claim 12, wherein the TB is selected to make A1 and A2 within 5% of each other.

14. The computer program product of claim 12, wherein the TB is selected to make A1 and A2 equal.

15. The non-transitory computer-readable medium of claim 12, wherein the instructions for determining the area under the measured curing curve comprises:
calculating instructions for calculating the area under the measured curing curve using the equation $$\sum_{n=1}^{tf}(TM-TB)_n(\Delta t)_n$$

wherein TM is the measured curing temperature, TB is the base temperature, $\Delta t$ is a time increment over which an nth difference is calculated and n is the number of time increments taken over a range between a start of the cure and $t_f$, a time when the cure is complete.

16. The non-transitory computer-readable medium of claim 12, wherein the difference between the TH and the TL is between 10° C. and 50° C.

17. The non-transitory computer-readable medium of claim 12, wherein the difference between the TH and the TL is between 15° C. and 70° C.

18. The non-transitory computer-readable medium of claim 12, wherein the article is at least a part of a tire.

19. The non-transitory computer-readable medium of claim 12, wherein the article is a cushion gum between a tire tread and a tire carcass.

20. The non-transitory computer-readable medium of claim 12, wherein the TH is the highest temperature on the high temperature curing curve.

21. The non-transitory computer-readable medium of claim 12, wherein the TL is the lowest temperature on the low temperature curing curve.

22. The non-transitory computer-readable medium of claim 12, further comprising:
obtaining instructions for obtaining the base temperature.

23. A system for curing a rubber article, the system comprising:
an autoclave comprising a chamber that is controllably heated for curing the rubber article;
a temperature sensor for generating a signal as a function of a curing temperature in the chamber of the autoclave; and
a controller for controlling the curing temperature in the autoclave and for indicating a completed cure of the rubber article, the controller comprising a processor and a memory storage device that stores instructions executable by the processor, such executable instructions including the instructions of claim 12, wherein the processor executes the instructions of claim 12.

* * * * *